Patented Apr. 19, 1927.

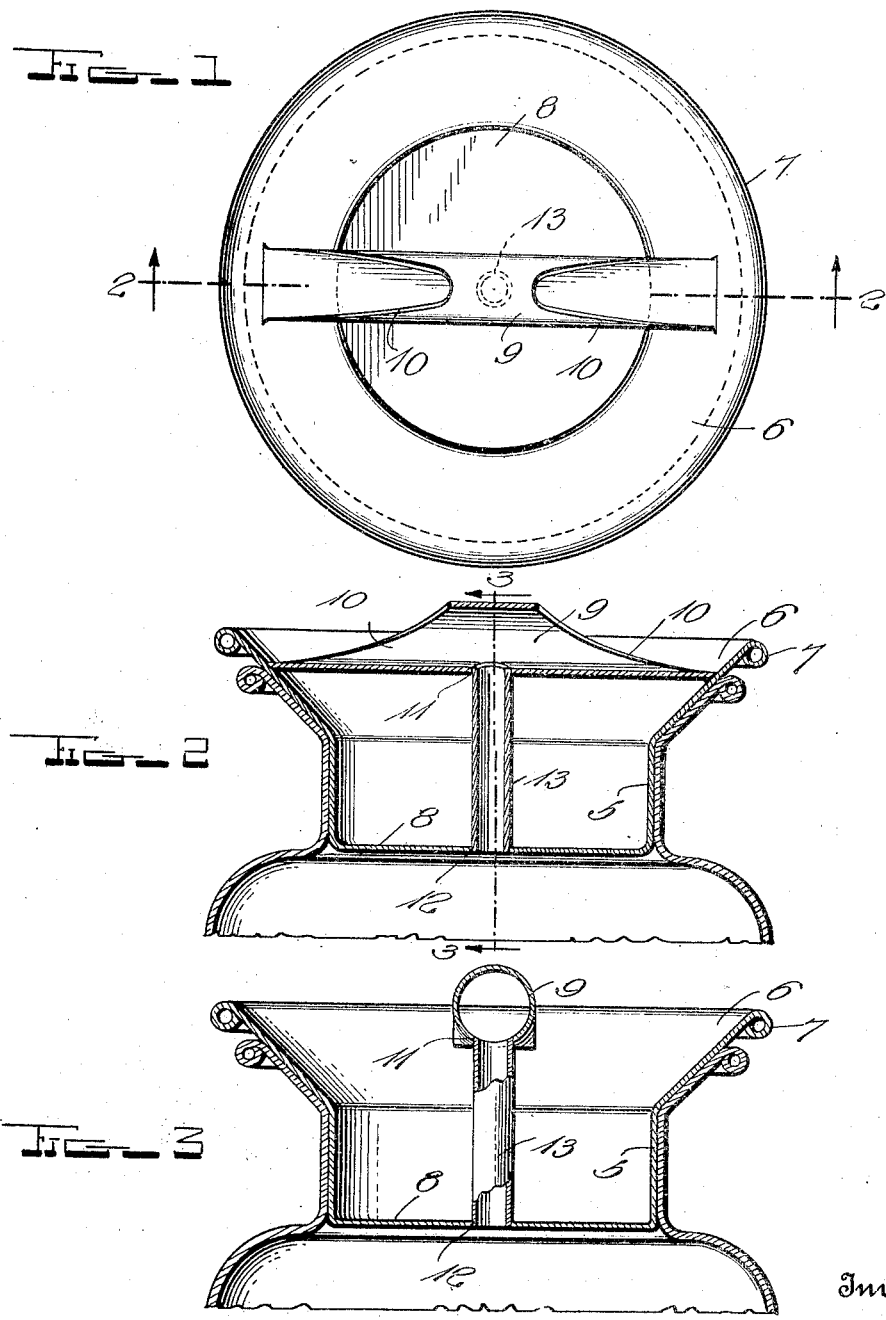

1,625,287

UNITED STATES PATENT OFFICE.

WILLIAM N. SNOW, OF BELOIT, WISCONSIN.

VENTILATED MILK-CAN COVER.

Application filed July 15, 1926. Serial No. 122,641.

The invention aims to provide a new and improved form of ventilated milk can cover, which may be easily and inexpensively manufactured and sold at small cost, will be efficient and desirable, and may be readily kept in an absolutely clean, sanitary condition.

With the foregoing in view, the invention resides in the novel subject matter hereinafter described and claimed, the description being supplemented by the accompanying drawing.

Figure 1 is a top plan view of the cover constructed in accordance with my invention.

Figure 2 is a sectional view on the plane indicated on line 2—2 of Figure 1, showing the cover applied to a milk can.

Figure 3 is a vertical sectional view on the correspondingly numbered line of Figure 2.

The cover comprises a cylindrical side wall 5 having a flared upper portion 6, preferably provided with a rolled edge 7. A flat bottom 8 is connected with the lower portion of the wall 5 and is preferably integral therewith, and it may be stated at this point, that the formation designated by the reference characters 5, 6, 7 and 8, may be part of a conventional form of milk can cover now in common use. The ordinary handle of this cover is removed however and my improved handle and ventilating means substituted.

The numeral 9 designates a tubular handle which extends diametrically across and is secured to the flared upper portion 6 of the cover, the upper portion of said tubular handle being cut away and open as indicated at 10, from the intermediate portion of said handle to its ends. The lower side of this handle is formed with a central opening 11 and a similar opening 12 is formed in the bottom 8. A one piece, vertical tube 13 extends between the handle 9 and the bottom 8 and is secured to these parts around the edges of their openings 11 and 12. In effecting these securing operations and in securing the handle to the wall of the cover, ordinary solder is preferably employed.

When the cover is applied to a can, it will effectively ventilate the same, permitting the milk to cool more rapidly and hence cutting down the bacteria count. Obviously, the tubular handle and the tube 13 place the interior of the can in communication with the outside air. In addition to performing this ventilating function, the handle 9 forms an effective grip for use in applying or removing the cover, and the tube 13 braces the handle against possible upward bending, this being very desirable when the ends of the handle are thinned as in the present disclosure, by cutting away the end portions of the handle at its upper side.

After washing the can, the cover may be reapplied and as this can will be effectively ventilated, no odor will be trapped in it, as would be the case if a tight cover were used.

The invention, it will be observed, is exceptionally simple and inexpensive, may therefore be easily and inexpensively manufactured and sold at small cost, yet is efficient and in every way desirable. On account of such advantages as these, the exact details herein disclosed are carefully followed. However, within the scope of the invention as claimed, variations may be made.

I claim:

A ventilated milk can cover comprising a cylindrical side wall having a flared upper portion, a bottom secured to the lower portion of the wall and having an opening, a tubular handle extending diametrically across and secured to the flared upper portion of the wall, the upper portion of said tubular handle being cut away and open at the ends of said handle, the lower side of said handle being formed with an opening alined with the opening of said bottom, and a one-piece tube secured to the handle and bottom around the edge walls of said openings.

In testimony whereof I have hereunto affixed my signature.

WILLIAM N. SNOW.